(No Model.)

E. N. PARKER.
FASTENER.

No. 604,542. Patented May 24, 1898.

Witnesses:
Chas. B. Shumway
Frank J. Demond.

Inventor
E. N. Parker
By Wm. T. Chapman
Atty.

UNITED STATES PATENT OFFICE.

ERASTUS N. PARKER, OF SPRINGFIELD, MASSACHUSETTS.

FASTENER.

SPECIFICATION forming part of Letters Patent No. 604,542, dated May 24, 1898.

Application filed August 21, 1896. Serial No. 603,504. (No model.)

*To all whom it may concern:*

Be it known that I, ERASTUS N. PARKER, a citizen of the United States, residing at Springfield, in the county of Hampden and State of Massachusetts, have invented certain new and useful Improvements in Fasteners; and I do hereby declare the following to be a full, clear, and exact description of the invention, such as will enable others skilled in the art to which it appertains to make and use the same.

My invention relates to fasteners for belts, abdominal supporters, corsets, and other articles worn about the body; and it has for its object to provide a form of fastener which can be quickly and readily fastened and unfastened by the sense of touch merely, which will have a capacity of adjustment to vary the effective length of the article to which it is applied, which will be perfectly secure when fastened, which when fastened will secure a free pivotal movement of the two meeting ends of the article upon each other, and which can be manufactured at a comparatively small cost.

To these ends my invention consists in the fastener constructed and operating as hereinafter fully described, and particularly pointed out in the claims.

Figure 1:
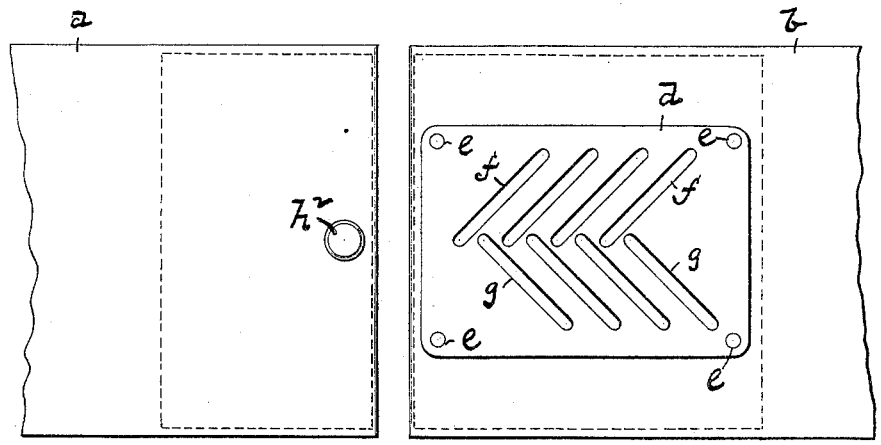
Figure 2:
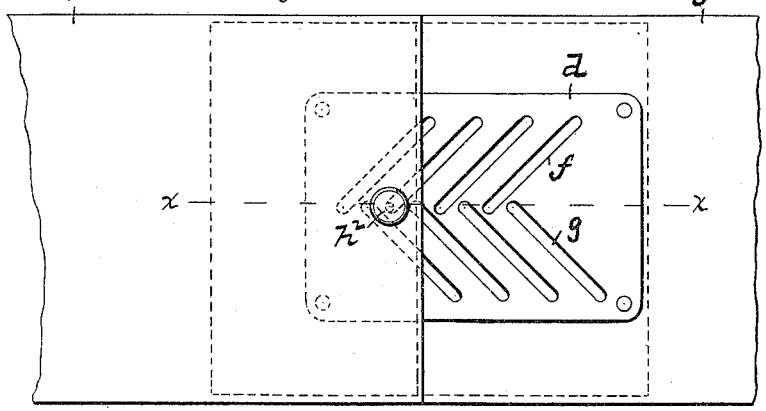
Figure 3:
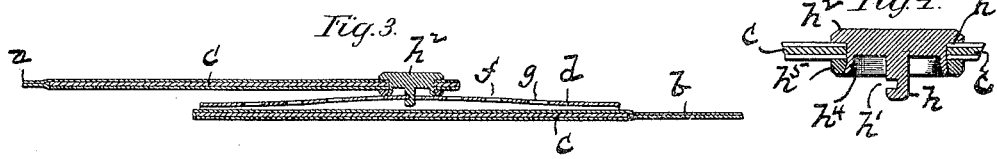
Figure 4:
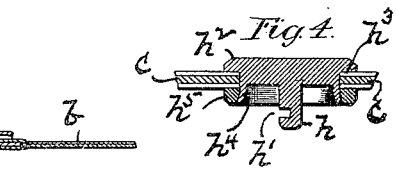

Referring to the drawings, in which like letters designate like parts in the several views, Figure 1 is a face view of the meeting ends of a belt having applied thereto a fastener embodying my invention, the two members of the latter being unfastened. Fig. 2 is a similar view showing the members of the fastener in their fastened position. Fig. 3 is a longitudinal section taken at line $x\ x$ of Fig. 2. Fig. 4 is an enlarged cross-section of the stud composing one member of the fastener.

The letters $a$ and $b$ designate, respectively, the two meeting ends of a belt, which is herein shown as one example merely of the various articles to which the fastener devised by me can be applied. By preference each of said belt ends will contain a stiffening-piece $c$, composed of thin sheet metal or other suitable material, as shown by broken lines in Figs. 1 and 2 and by full lines in Figs. 3 and 4, to afford a more secure connection between the members of the fastener and said ends.

One of the two members of the fastener is composed of a plate $d$, preferably composed of thin sheet metal and of rectangular shape, which plate is preferably secured to the belt end $b$ by means of four rivets $e$, passing through the same at its four corners and through the stiffening-plate $c$ and the fabric composing the belt. Within said plate $d$ are located two series of slots $f$ and $g$, the slots of each series being parallel with each other and at a right angle, or substantially so, to the slots of the opposite series, all of said slots commencing at the center line of the plate, transversely, at progressively-increasing distances from the front end of the plate. In other words, said plate is provided with a series of holes located at increasingly-varying distances from its front end and in the plane of its transverse center line, each of which holes has a slot leading therefrom toward one of the side edges of the plate, the slots of adjacent holes standing at substantially a right angle to each other. The central portion of said plate $d$ is slightly deflected outwardly, as shown in Fig. 3, to enable the end of the stud composing the opposite member of the fastener to be inserted through the slots, as will be presently described.

The second member of the fastener consists, essentially, of a stud or hook projecting from the inner side of the belt end $a$ to engage the slots in said plate $d$. I prefer to construct said stud as shown in Figs. 3 and 4, in which the stud $h$, having the notch $h'$ in the side thereof, is provided with the circular head $h^2$, formed integral therewith, and said head is provided with an annular shoulder $h^3$ and with a projecting annular flange $h^4$, concentric to said stud. In securing said stud to the belt the head $h^2$ is thrust through the latter until the shoulder $h^3$ bears against the outer surface thereof. A ring $h^5$ is then exteriorly applied to the flange $h^4$ at the opposite side of the belt, which ring has its inner surface slightly beveled at its outer edge, as shown, after which, by means of a tubular reamer or other suitable tool, the outer end of the flange $h^4$ is spun or deflected outwardly against said beveled surface of the ring in such manner as to securely rivet the head in position. I thus secure, in a very simple and inexpensive manner, the stud to the belt in such manner that it cannot become loosened in the use of the latter; but it is obvious that various other ways of securing the same can be employed within the spirit of my invention.

To fasten the two ends of the belt together, it is necessary simply to lap the end $a$ over the end $b$ and insert the end of the stud $h$ within any one of the slots $f$ or $g$, whereupon its notch $h'$ engages the wall of said slot, and the strain on the belt causes it to travel to the front end of the slot at the transverse center of plate $d$, as shown in Fig. 2. It can be as readily disengaged by simply pressing the two ends of the belt toward each other and withdrawing the stud from the slot.

It will be observed that a range of adjustment equal to the number of the slots in plate $d$ is afforded for varying the effective length of the belt and that by carrying the stud $h$ to almost any point in the area of the plate $d$ it will be caused to engage some one of the two series of slots, after which it will infallibly be carried to the center of said plate, to thereby secure an even draft of one of the belt ends upon the other. Said last-mentioned feature is of especial importance when the fastener is applied to an abdominal supporter or other article which fastens at the back of the wearer, as it entirely obviates the necessity of repeated efforts to insert the stud into an opening at any particular point in the plate by the sense of touch alone, an operation which is particularly inconvenient and laborsome to stoutly-built persons, for whom such supporters are especially designed. It will be noted also that when the stud $h$ occupies its locked position at the front end of one of the slots in plate $d$ a perfect freedom for pivotal movement between the stud and belt is afforded to permit the belt to adapt itself to the movements of the body.

By arranging the slots in plate $d$ so that each is independent of the others, as shown, I leave enough unbroken stock in the center of the plate to preserve its strength—a very important feature in this class of fasteners.

Various modifications in the number and size of the slots employed and in the manner of securing the two members of the fastener to the article with which they are used can be made without departure from the scope of my invention.

Having thus fully described my invention, what I claim, and desire to secure by Letters Patent, is—

1. A fastener for belts, &c., composed of two members, one of said members being composed of a backing-plate and a superimposed plate secured to said backing-plate, said superimposed plate containing two series of slots, the slots of each series being parallel with each other and at substantially a right angle to those of the other series and all of said slots terminating at their front end at the transverse center line of the plate and at their rear end at points within the side edges of the plate, and the other of said members comprising a hook or stud adapted to make a locking engagement with the slots in said plate, each of said members being provided with means whereby it can be secured to one of the meeting ends of a belt or similar article, substantially as described.

2. A fastener for belts, &c., one member of which consists of the plate $d$ having therein the slots $f$ and $g$ arranged as described, and the other member of which consists of the notched stud $h$ having its head $h^2$ provided with the annular shoulder $h^3$ and annular flange $h^4$, and ring $h^5$, substantially as set forth.

In testimony whereof I affix my signature in presence of two witnesses.

ERASTUS N. PARKER.

Witnesses:
WM. H. CHAPMAN,
FRANK J. DEMOND.